(12) United States Patent
Atherley (10) Patent No.: US 7,699,043 B2
(45) Date of Patent: *Apr. 20, 2010

(54) NITROUS-OXIDE SYSTEM FOR AN ENGINE

(76) Inventor: Jim Atherley, 406 W. Industrial Dr., Pleasant Grove, UT (US) 84062

( * ) Notice: Subject to any disclaimer, the term of this patent is extended or adjusted under 35 U.S.C. 154(b) by 0 days.

This patent is subject to a terminal disclaimer.

(21) Appl. No.: 12/251,051

(22) Filed: Oct. 14, 2008

(65) Prior Publication Data

US 2009/0032001 A1   Feb. 5, 2009

Related U.S. Application Data

(63) Continuation of application No. 11/386,055, filed on Mar. 20, 2006, now Pat. No. 7,451,751, which is a continuation-in-part of application No. 11/298,291, filed on Dec. 9, 2005, now abandoned.

(60) Provisional application No. 60/635,211, filed on Dec. 10, 2004.

(51) Int. Cl.
*F02B 23/00* (2006.01)
*F02M 51/00* (2006.01)

(52) U.S. Cl. .................... 123/585; 123/445

(58) Field of Classification Search .............. 123/531, 123/525, 527, 575, 585, 445
See application file for complete search history.

(56) References Cited

U.S. PATENT DOCUMENTS

| | | | |
|---|---|---|---|
| 4,474,175 A | 10/1984 | Hudimac, Jr. | |
| 4,494,488 A | 1/1985 | Wheatley | |
| 4,683,843 A * | 8/1987 | Norcia et al. | 123/575 |
| 5,287,281 A | 2/1994 | Meaney | |
| 5,522,421 A | 6/1996 | Holt et al. | |
| 5,921,765 A | 7/1999 | Smith | |
| 5,967,099 A | 10/1999 | Patrick | |
| 6,105,563 A | 8/2000 | Patrick | |
| 6,260,546 B1 | 7/2001 | Vaughn | |
| 6,453,894 B1 | 9/2002 | Fischer et al. | |
| 6,523,530 B2 | 2/2003 | Evert et al. | |
| 6,758,198 B1 | 7/2004 | Suhre et al. | |
| 6,938,841 B2 | 9/2005 | Holtzman | |
| 6,955,160 B1 | 10/2005 | Konopacki et al. | |
| 7,082,933 B1 | 8/2006 | Holtzman | |
| 7,451,751 B2 | 11/2008 | Atherley | |

(Continued)

OTHER PUBLICATIONS

NOS Nitrous Oxide, A Division of Holley Performance, "Nos A Holley Performance Brand" www.holley.com/HiOctn/NewsInfo/NewsRels/NewsRels.html 1 page, Feb. 28, 2002.

*Primary Examiner*—Noah Kamen
(74) *Attorney, Agent, or Firm*—Thorpe North & Western LLP (57) ABSTRACT

A nitrous-oxide system for an engine includes a nozzle coupled to a nitrous-oxide bottle by a nitrous-oxide line. A nitrous-oxide valve is coupled to the nitrous-oxide line between the nitrous-oxide bottle and the nozzle. A control switch, operatively coupled to the nitrous-oxide valve. A pressure regulator, coupled to the nitrous-oxide line between the nitrous-oxide bottle and the nozzle, and is capable of regulating pressure of the nitrous-oxide to lower than 500 psi. The nozzle can be positioned adjacent a carburetor inlet to force nitrous-oxide into a carburetor throat.

19 Claims, 7 Drawing Sheets

U.S. PATENT DOCUMENTS

| | | |
|---|---|---|
| 2003/0062428 A1 | 4/2003 | Baasch et al. |
| 2004/0025832 A1 | 2/2004 | Baasch et al. |
| 2004/0084032 A1 | 5/2004 | Baasch et al. |
| 2004/0139950 A1 | 7/2004 | Flynn et al. |
| 2004/0250804 A1 | 12/2004 | Young |
| 2005/0001074 A1 | 1/2005 | Holtzman |
| 2006/0037591 A1 | 2/2006 | Ferguson |
| 2006/0254567 A1 | 11/2006 | Holtzman |

* cited by examiner

NITROUS-OXIDE SYSTEM FOR AN ENGINE

PRIORITY CLAIM

This application is a continuation of U.S. patent application Ser. No. 11/386,055, filed Mar. 20, 2006, now U.S. Pat. No. 7,451,751, which is a continuation in part of U.S. patent application Ser. No. 11/298,291, filed Dec. 9, 2005, now abandoned which claims priority of U.S. Provisional Patent Application Ser. No. 60/635,211, filed Dec. 10, 2004, which are all herein incorporated by reference.

BACKGROUND OF THE INVENTION

1. Field of the Invention

The present invention relates generally to a nitrous-oxide system for a vehicle, namely a vehicle with a gasoline powered internal combustion engine.

2. Related Art

Nitrous-oxide systems (NOS) or nitrous-oxide (N2O) chargers have been developed to increase engine performance. Such systems inject compressed nitrous-oxide into the combustion chamber of an engine during the fuel intake stroke of the combustion chamber piston to provide more oxygen for combustion. More oxygen in the combustion chamber means that more fuel can also be injected during the intake stroke. The increase in fuel and oxygen during the combustion cycle results in greater energy being transferred to the piston which increases the stroke cycle of the piston. The increased stroke cycle of the pistons is then transferred to the cam shaft which ultimately results in an increase in horse power of the engine.

Compressed nitrous-oxide also vaporizes and cools when it is released from the pressure vessel in which it is stored. This provides a cooling effect on the intake air. Reducing the intake air temperature increases the air's density, and provides even more oxygen to the engine. For the engine to operate properly, the nitrous-oxide and fuel mixture ratio must be correct.

Such nitrous-oxide systems have been applied to many types of gasoline internal combustion engines, including high performance racing engines, 8 cylinder, 6 cylinder, 4 cylinder and 2 cylinder engines. These NOS systems are "high" pressure systems that operate with nitrous-oxide pressures at 800-1000 psi. To maintain these pressures, the nitrous-oxide, or the cylinder or bottle holding the nitrous-oxide, must be maintained at 80-90 degrees Fahrenheit. It will be appreciated, however, that snowmobiles are operated in lower temperature environments. If the temperature of the nitrous-oxide is lowered, the mixture of the nitrous-oxide and fuel is improper, lowering efficiency and power.

In addition, such nitrous-oxide systems are often coupled to the engine or vehicle electrical systems, making them difficult to install, and dependent on voltage fluctuations of the engine electrical system.

SUMMARY OF THE INVENTION

It has been recognized that it would be advantageous to develop a nitrous-oxide system for snowmobiles, and other vehicles that can be operated at lower temperatures, and/or lower pressures. It would further be advantageous to have a nitrous-oxide system which operates independent from a vehicle or engine electrical power system.

The invention provides a nitrous-oxide system with a nitrous-oxide bottle configured to contain nitrous-oxide. A nitrous-oxide line is coupled at a proximal end to the nitrous-oxide bottle. A nozzle is coupled to the distal end of the nitrous-oxide line. The nozzle can be disposed in an engine air box. A nitrous-oxide valve can be coupled to the nitrous-oxide line between the nitrous-oxide bottle and the nozzle. A control switch can be operatively coupled to the nitrous-oxide valve. A low-pressure regulator is coupled to the nitrous-oxide line that is capable of regulating pressure of the nitrous-oxide to pressures lower than 500 psi.

In accordance with another aspect of the invention, the system includes a fuel controller that can be coupled to a control switch and configured to be coupled to an electronic fuel injector system in order to change the fuel injector system to provide more fuel when the control switch is activated.

In accordance with another aspect of the invention, the system includes a dual valve that can be coupled in the nitrous-oxide line between the nitrous-oxide bottle and nitrous-oxide nozzle and also between a fuel line and an auxiliary fuel line. The dual valve can have a nitrous-oxide inlet coupled to the nitrous-oxide bottle and a nitrous-oxide outlet coupled to the nozzle. A fuel inlet can be coupled to a fuel line and a fuel outlet coupled to a carburetor. A stopper can be movable in the valve between the nitrous-oxide inlet and the nitrous-oxide outlet and between the fuel inlet and the fuel outlet in order to simultaneously open and close the nitrous-oxide and fuel lines. A control line between the nitrous-oxide line and the stopper can utilize the pressure of the nitrous-oxide to move the stopper. A control valve can be coupled to the control line and a solenoid can be coupled to the control valve.

The present invention also provides for a method for retrofitting an engine of a gasoline powered vehicle with a nitrous-oxide system including positioning a nozzle at an inlet of a carburetor. The nozzle can be coupled to a nitrous-oxide bottle. The nozzle can be oriented to direct the flow of nitrous-oxide into the throat of the carburetor. Additionally, an auxiliary fuel nozzle can be positioned at an outlet of the carburetor.

Additional features and advantages of the invention will be apparent from the detailed description which follows, taken in conjunction with the accompanying drawings, which together illustrate, by way of example, features of the invention.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention generally provides for a nitrous-oxide system for selectively increasing the performance of an engine and/or providing a power boost to an engine. Snowmobiles, All-Terrain Vehicles (ATVs), motorcycles, riding lawnmowers and tractors are examples of vehicles that can benefit from the use of nitrous-oxide systems. The nitrous-oxide system includes a nitrous-oxide source, such as a pressure vessel or bottle filled with nitrous-oxide. Delivery lines can deliver nitrous-oxide from the bottle to a nozzle. The nozzle can inject the nitrous-oxide into the air box of the engine where the nitrous will move with the intake air to combine with the vehicle fuel. Valves for both fuel and nitrous-oxide can be disposed in a single box. In addition, a battery power source can be disposed in the box. Furthermore, a low-pressure regulator can be operatively coupled to the nitrous-oxide source to regulate pressure of the nitrous-oxide below 500 psi, or below 300 psi, or even as low as 280 psi. The regulator can be a fixed, in-line regulator to deliver nitrous-oxide at a fixed pressure. The regulator can provide a nitrous-oxide at a constant pressure, despite a great range of ambient and operating temperatures.

Figure 1:
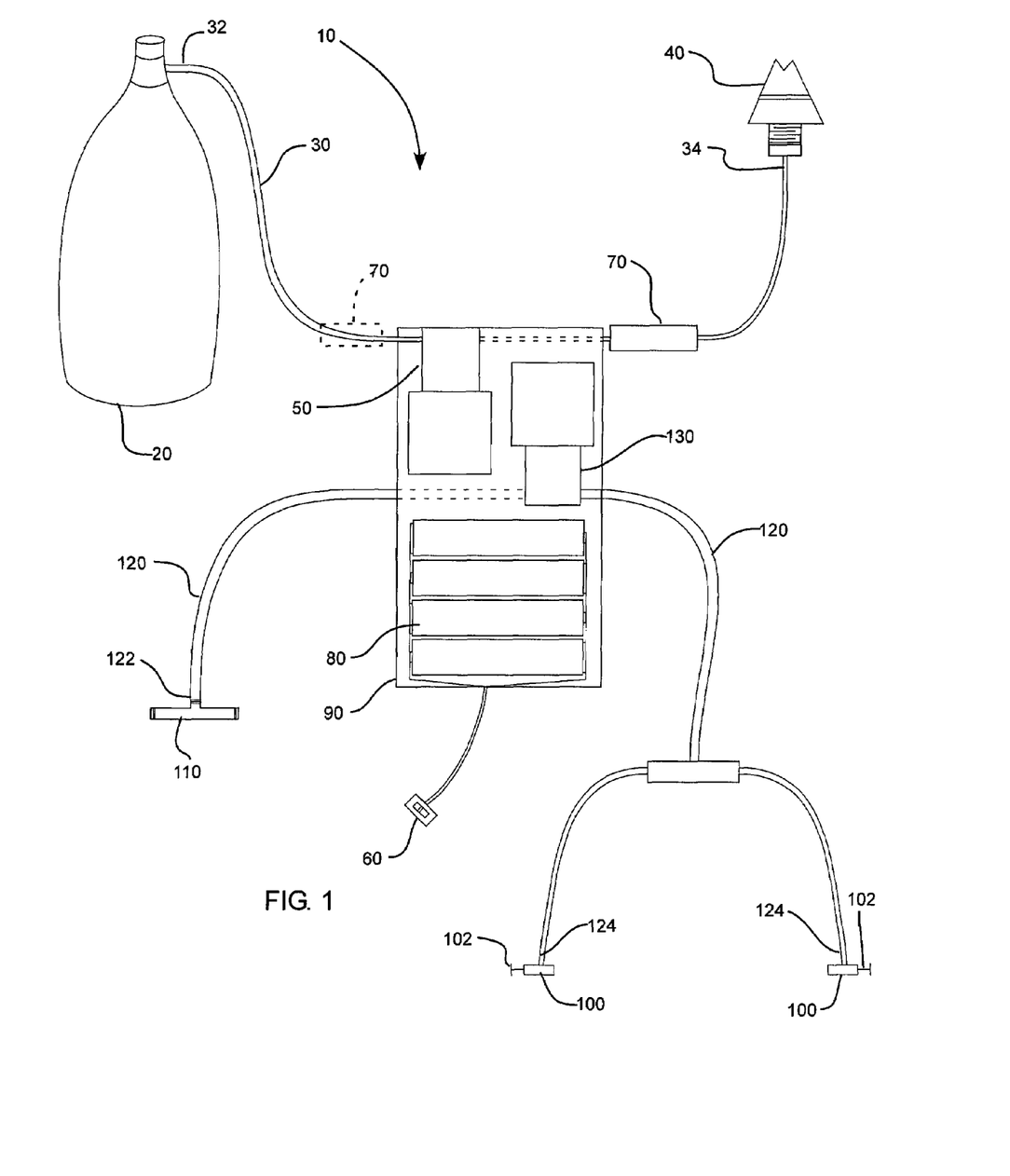
FIG. 1 is a schematic view of a nitrous-oxide system in accordance with an embodiment of the present invention.

As illustrated in FIG. 1, a nitrous-oxide system 10 in accordance with an embodiment of the present invention is shown. The nitrous-oxide system has a nitrous-oxide source, such as a bottle reservoir 20. The nitrous-oxide bottle 20 is configured to contain pressurized nitrous-oxide. In one aspect, the nitrous-oxide bottle 20 can contain pressurized liquid nitrous-oxide.

A nitrous-oxide line 30 can have a proximal end 32 coupled to the nitrous-oxide bottle. A nozzle 40 can be coupled to the distal end 34 of the nitrous-oxide line. The nozzle 40 can be operatively coupled to an engine intake such as an air-box, or the like. The term "air-box" is used broadly herein to refer to any engine structure upstream of the cylinder(s). A nitrous-oxide valve 50 can be coupled to the nitrous-oxide line 30 between the nitrous-oxide bottle 20 and the nozzle 40. The nitrous-oxide valve 50 controls release of the nitrous-oxide from the bottle to the nozzle. A control switch 60 can be operatively coupled to the nitrous-oxide valve 50. The control switch 60 can be mounted on the vehicle, such as by a throttle, to be actuated by a user. Thus, when the user actuates the control switch 60, the nitrous-oxide valve 50 opens and allows nitrous-oxide from the bottle to the nozzle, and thus the engine. A low-pressure regulator 70 can also be coupled to the nitrous-oxide line 30 to regulate the pressure of the nitrous-oxide, as described below.

Coupling the nozzle 40 to an air box allows the nitrous-oxide to be injected into the engine ahead of the fuel. Advantageously, injecting nitrous-oxide ahead of fuel reduces the chances that too much fuel will be sent to the engine causing the engine to bog down. Instead, in the present invention, the nitrous-oxide is drawn into the carburetor with the air and mixed with the fuel according to the settings of the carburetor.

Figure 2:
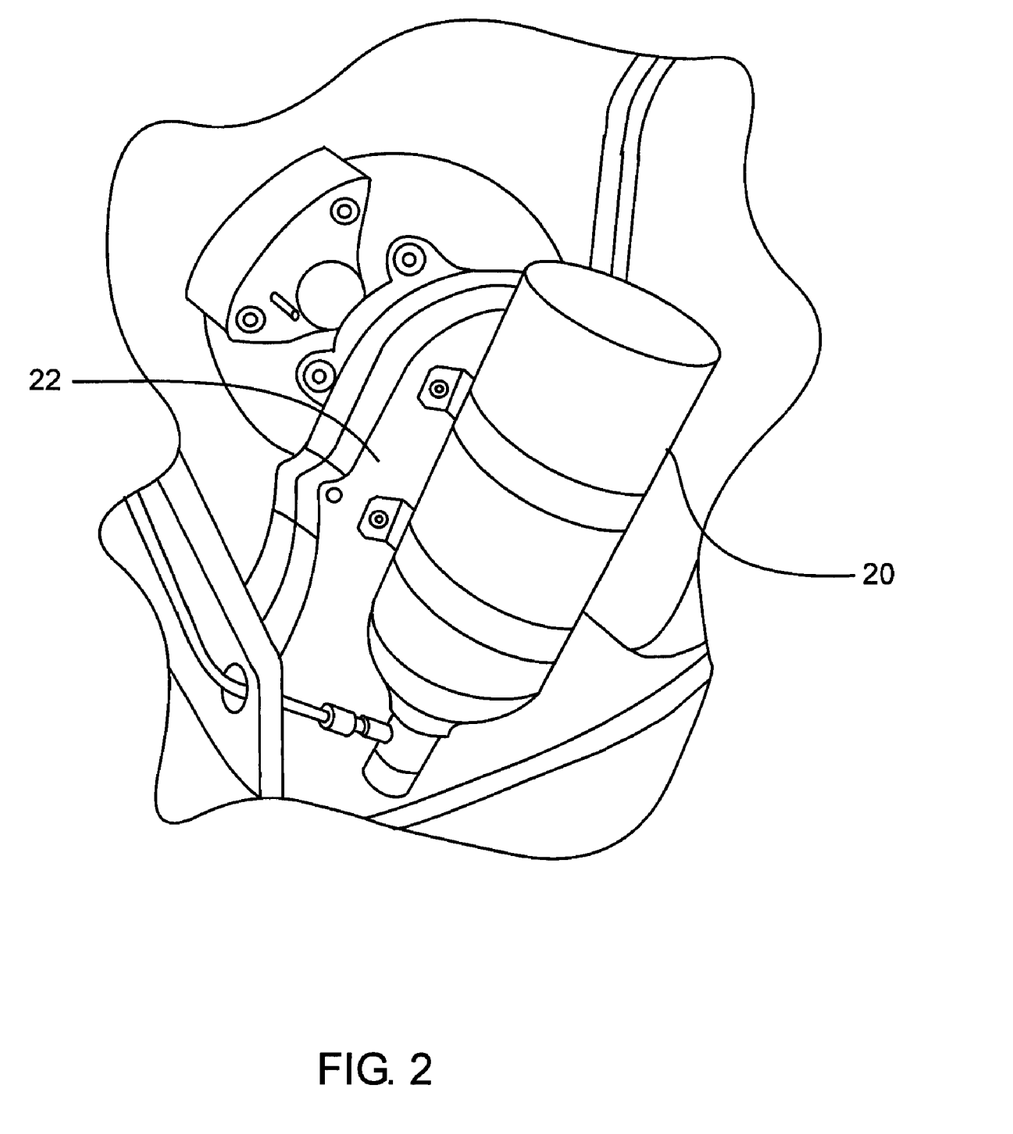
FIG. 2 is a schematic perspective view of a nitrous-oxide bottle of the nitrous-oxide system of FIG. 1 mounted to a vehicle.

The nitrous-oxide bottle 20 can be mounted on structure of the vehicle. The structure of the vehicle can include a bulkhead, belly pan, hood, side panels steering column and the like. It will be appreciated that the nitrous-oxide bottle can be mounted anywhere there is sufficient space, and where the bottle will not interfere with engine operation. For example, FIG. 2 illustrates the nitrous-oxide bottle 20 mounted on the side of a brake shoe 22.

Returning to FIG. 1, the nitrous-oxide valve 50 can control the flow of nitrous-oxide flowing through the nitrous-oxide line 30 to the nozzle 40. In one aspect the nitrous-oxide valve can be a solenoid valve. The nitrous-oxide valve can also be a flow control valve, a gate valve, a ball valve, a pilot valve, a proportional valve, a globe valve, a check valve, a needle valve, and a stopcock valve.

The low pressure regulator 70 can regulate the pressure of the nitrous-oxide to a lower pressure. In one aspect, the regulator is capable of regulating pressure of the nitrous-oxide at less than 500 psi, and less than 300 psi in another aspect, and even as low as 280 psi. The low-pressure regulator 70 can maintain the pressure of the nitrous-oxide at lower than 300 psi until the nitrous-oxide bottle is approximately 10% full. The low-pressure regulator 70 can be an in-line regulator. The low-pressure regulator 70 can be positioned between the nitrous-oxide valve 40 and the nozzle 50, as shown. Alternatively, the low-pressure regulator 70 can also be positioned between the nitrous-oxide bottle 20 and the nitrous-oxide valve 40, as shown by dashed lines in FIG. 1.

With the nitrous-oxide pressure regulated down to 280 psi, the nitrous-oxide boost system 10 will function in temperatures around 0 degrees Fahrenheit. This is advantageous for operating snowmobiles since they are frequently driven in extremely cold conditions. Additionally, this eliminates the need for heating the nitrous-oxide bottle 20 to maintain pressure of the nitrous-oxide. It will be appreciated that in order for an engine to work efficiently, the fuel to air (oxygen) mixture or ratio needs to be correct. Adding nitrous-oxide to an engine requires additional fuel to maintain the fuel to air mixture or ratio for efficient operation. It will also be appreciated that the pressure within a nitrous-oxide bottle varies with temperature. Thus, as the temperature changes, the pressure of the nitrous-oxide changes, and thus the amount of nitrous-oxide delivered to the engine can change. As the amount of nitrous-oxide changes, so does the efficiency of the engine. Thus, variations in the temperature can lead to variations in the engine performance. It will be further appreciated that with snowmobiles, temperature can change dramatically, having a dramatic effect on engine performance with a nitrous-oxide system. Prior nitrous-oxide bottles for snowmobiles have included an electric blanket heater to maintain the temperature of the nitrous-oxide in an attempt to maintain engine performance. Such electric blankets have limited abilities as snowmobiles are often run intermittently, thus providing only intermittent power for the electric blanket. The low pressure regulator of the present invention helps maintain a constant pressure of the nitrous-oxide delivered to the engine, thus maintaining engine performance, despite changes in temperature.

Additionally, the low pressure regulator 70 of the present invention can regulate the pressure of the nitrous-oxide to maintain a predetermined, constant pressure of the nitrous-oxide for any given temperature within an operating temperature range. For example, as the temperature of the liquid nitrous-oxide in the nitrous-oxide bottle increases, the pressure regulator 70 can regulate the pressure to maintain a predetermined, constant injection pressure for nitrous-oxide injected into the engine through the nozzle 40. In one aspect, the operating temperature range can be between –20 degrees Fahrenheit and 120 degrees Fahrenheit, and the predetermined pressure can be a pressure as low as 280 psi. Thus, the pressure regulator 70 can adjust the pressure of the nitrous-oxide in order to maintain the predetermined, constant injection pressure of the nitrous-oxide as the temperature of the nitrous-oxide changes.

It will also be appreciated that the pressure of the nitrous-oxide can be held constant by holding the temperature of the nitrous-oxide constant. Bottle warmers, and the like, are an attempt to regulate the temperature of the nitrous-oxide in order to maintain a constant injection pressure of the nitrous-oxide into the engine. In contrast, the low pressure regulator 70 of the present invention regulates the pressure of the nitrous-oxide so that the pressure of the nitrous-oxide injected into the engine fuel is constant over a range of operating temperatures. Advantageously, the pressure regulator 70 of the present invention eliminates the need to warm the nitrous-oxide bottle 20, thus, eliminating the weight and power drain of bottle warming equipment from the engine.

A battery power source 80, such as batteries, can be electrically coupled to the nitrous-oxide valve. The battery power source 80 can be free from transfer of electricity with the engine and free from electrical interference from the engine. Specifically, the battery power 80 source can be separate from the battery source and electrical system coupled to the engine. For example, the battery power source 80 for the nitrous-oxide system 10 can be as simple and inexpensive as a plurality of AA size batteries connected in series. Alternatively, the battery power source can utilize rechargeable batteries. Thus, the nitrous-oxide system 10 can have a power source 80 that is independent of the engine or vehicle power source.

An independent power source provides several advantages. First, power from the vehicle engine remains available to the engine during operation of the vehicle. Additionally, fluctuations in the vehicle power will not affect power available to the nitrous-oxide system 10. It will be appreciated that some vehicle electrical systems, such as snowmobiles, are inconsistent and/or include excessive noise that is difficult to utilize. Having a consistent source of power available to the nitrous-oxide system 10 ensures a consistent amount of nitrous-oxide is injected into the engine every time the nitrous-oxide system is engaged. Furthermore, the independent power source has eliminated the need to splice into the engine's existing power source, thus saving time during installation and reducing the chances of loose or faulty connections between the power source and the nitrous-oxide valve 40.

In addition, the valve 40 and battery power source 80 can be disposed in a single enclosure 90, such as a box, to facilitate installation. The enclosure 90 can include means for attaching the enclosure to structure on the vehicle. For example, the means for attaching can include hook-and-loop type fasteners, adhesives, straps, bolts, and/or brackets, or the like. The structure of the vehicle to which the enclosure can be attached can include the air box, bulkhead, belly pan, hood, side panel, steering column, and the like. For example, FIG. 3 illustrates the nitrous-oxide system 10 mounted to a snowmobile 300 with the enclosure 90 mounted to a side panel 320 of the snowmobile's engine compartment 330.

Figure 3:
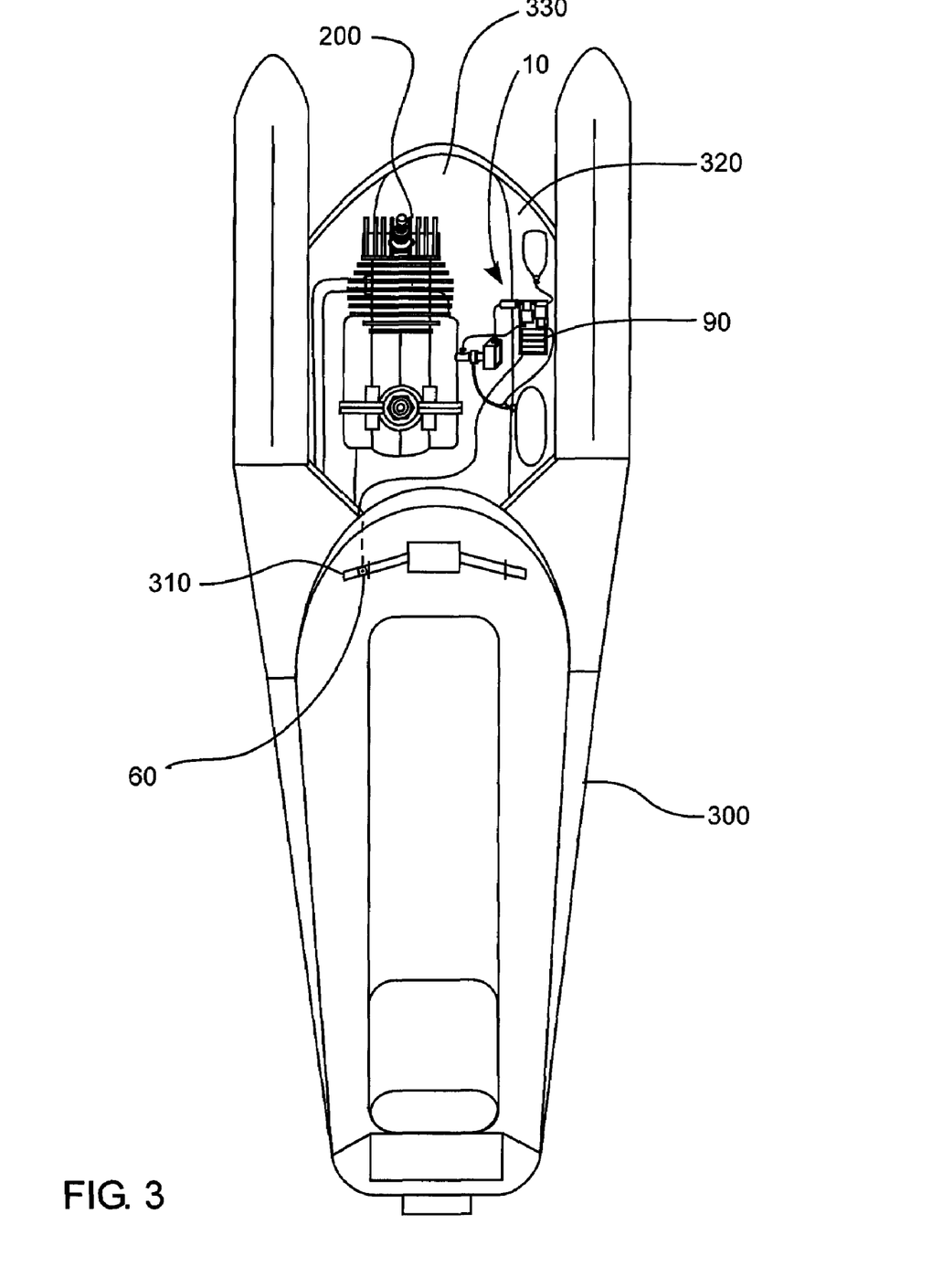
FIG. 3 is a schematic view of the nitrous-oxide system of FIG. 1 coupled to a snowmobile.

FIG. 3 also illustrates placement of the control switch 60. The control switch 60 can be operatively coupled to the nitrous-oxide valve 50 or battery power source 80 to active the nitrous-oxide valve. The control switch 60 can be located to facilitate operation, such as on a control panel or steering mechanism 310 of the vehicle. The steering mechanism 310 can be the handlebar 310 of a snowmobile 300, as shown in FIG. 3.

Returning to FIG. 1, the nitrous-oxide system 10 can also have a secondary fuel line 120. The secondary fuel line 120 can be coupled to a primary fuel line 110. The secondary fuel line 120 can have a proximal end 122 coupled to the primary fuel line 110, and can extend to distal ends 124 that can be coupled to an engine. The secondary fuel line 120 can extend through the enclosure 90. The secondary fuel line 120 can provide a secondary source of fuel with respect to the primary fuel line.

Fuel adjustment valves 100 can be coupled to the secondary fuel line 120. The fuel adjustment valves 100 can have manually adjustable fuel adjustment knobs 102 so that the user can adjust the valves by hand, without tools. An adjustable fuel valve can be provided for each cylinder or carburetor on a vehicle's engine. Alternatively, a single adjustable valve can be provided in the secondary fuel line.

An automatic fuel valve 130 can also be coupled to the secondary fuel line 120 to control the flow of fuel through the secondary fuel line 120. The automatic fuel valve 120 can be coupled to the battery source 80 and disposed in the enclosure 90 with the battery power source 80 and the nitrous-oxide valve 50. The control switch 60 can also be operatively coupled to the automatic fuel valve 130 to control fuel flow in the secondary fuel line 120. The secondary fuel line provides additional fuel to the engine to correspond to the increased oxygen from addition of the nitrous-oxide.

In operation, a user activates the power switch when a power boost is required or desired. The power switch provides power from the battery power source to the nitrous-oxide valve 50 and fuel valve 130, causing the nitrous-oxide valve 50 and fuel valve 130 to open. As the valves open, fuel and nitrous-oxide flow into the engine, thereby increasing power output of the engine upon combustion. Releasing the power switch causes the valves to close.

Figure 4:
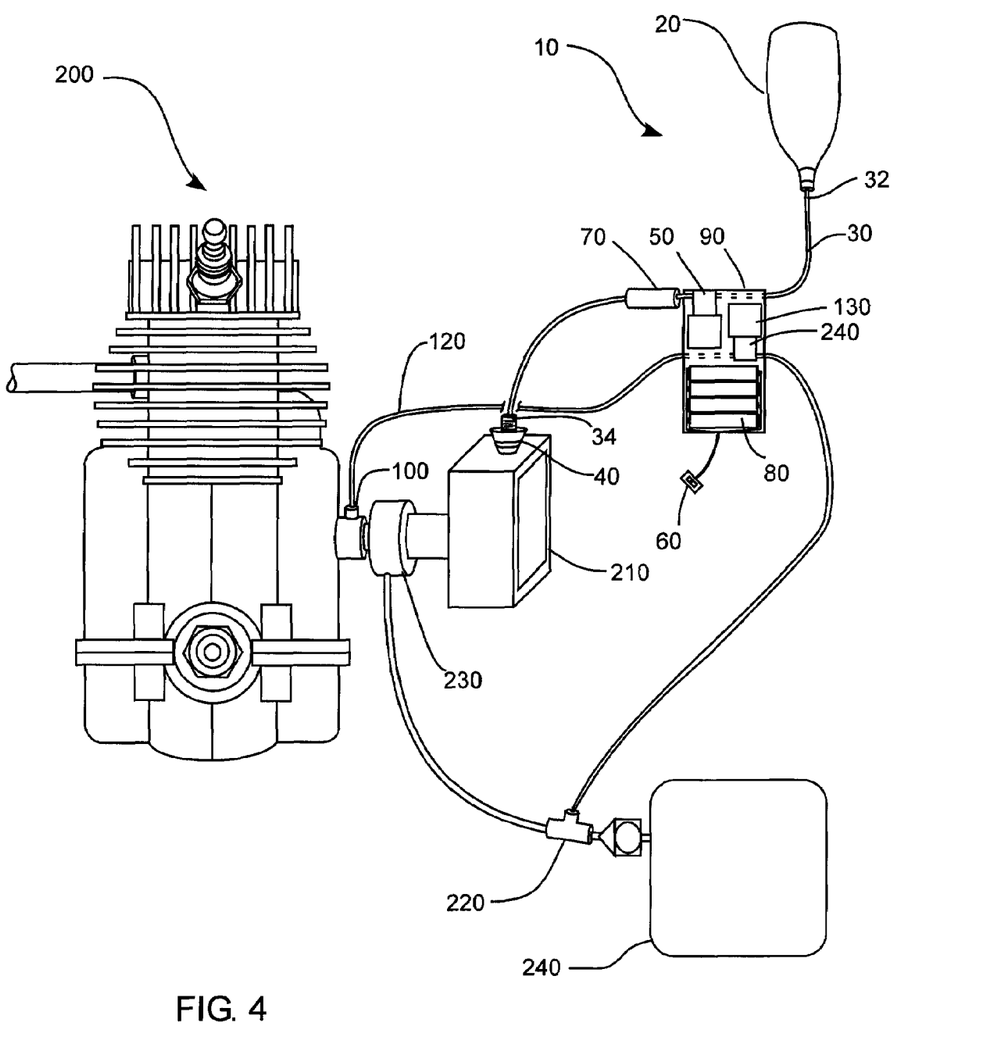
FIG. 4 is a schematic view of the nitrous-oxide system of FIG. 1 coupled to a carburetor regulated internal combustion engine.

Turning now to FIG. 4, a schematic view of a nitrous-oxide system 10 coupled to an engine 200 in accordance with an embodiment of the present invention is shown. A nitrous-oxide bottle 20 containing nitrous-oxide can be coupled to the proximal end 32 of a nitrous-oxide line 30. A nozzle 40 can be coupled to the distal end 34 of the nitrous-oxide line, and disposed in an air-box 210. A nitrous-oxide valve 50 can be coupled to the nitrous-oxide line 30 to control flow of nitrous-oxide from the nitrous-oxide bottle to the nozzle. A battery power source 80 can be electrically coupled to the nitrous-oxide valve. A control switch 60 can be operatively coupled to the nitrous-oxide valve 50 or battery power source 80, to activate the nitrous-oxide valve 50.

A secondary fuel line 120 can be tapped into the engine's primary fuel line 220, and can extend to a carburetor 230, to provide a secondary source of fuel from with respect to the primary fuel line 220 and the carburetor 230. A fuel valve 130 can be coupled to the secondary fuel line 220 to control flow of fuel through the secondary fuel line to the carburetors 230.

As discussed above, an enclosure 90 can be disposed about the nitrous-oxide valve 50, the fuel valve 130, and the battery power source 80. A low-pressure regulator 70 can also be disposed in, or adjacent to the enclosure 90, and coupled to the nitrous-oxide line 30 between the nitrous-oxide valve 50 and the nozzle 40, or between the nitrous-oxide bottle 20 and the valve 50.

Advantageously, having the valves 50 and 130 and battery power source 80 contained in an enclosure 90 allows for preassembly at the factory of the nitrous-oxide system 10. Having the nitrous-oxide system 10 preassembled reduces installation time and complexity because the user need not assemble many small parts, but instead only needs to splice into the engine fuel lines and air box.

Figure 5:
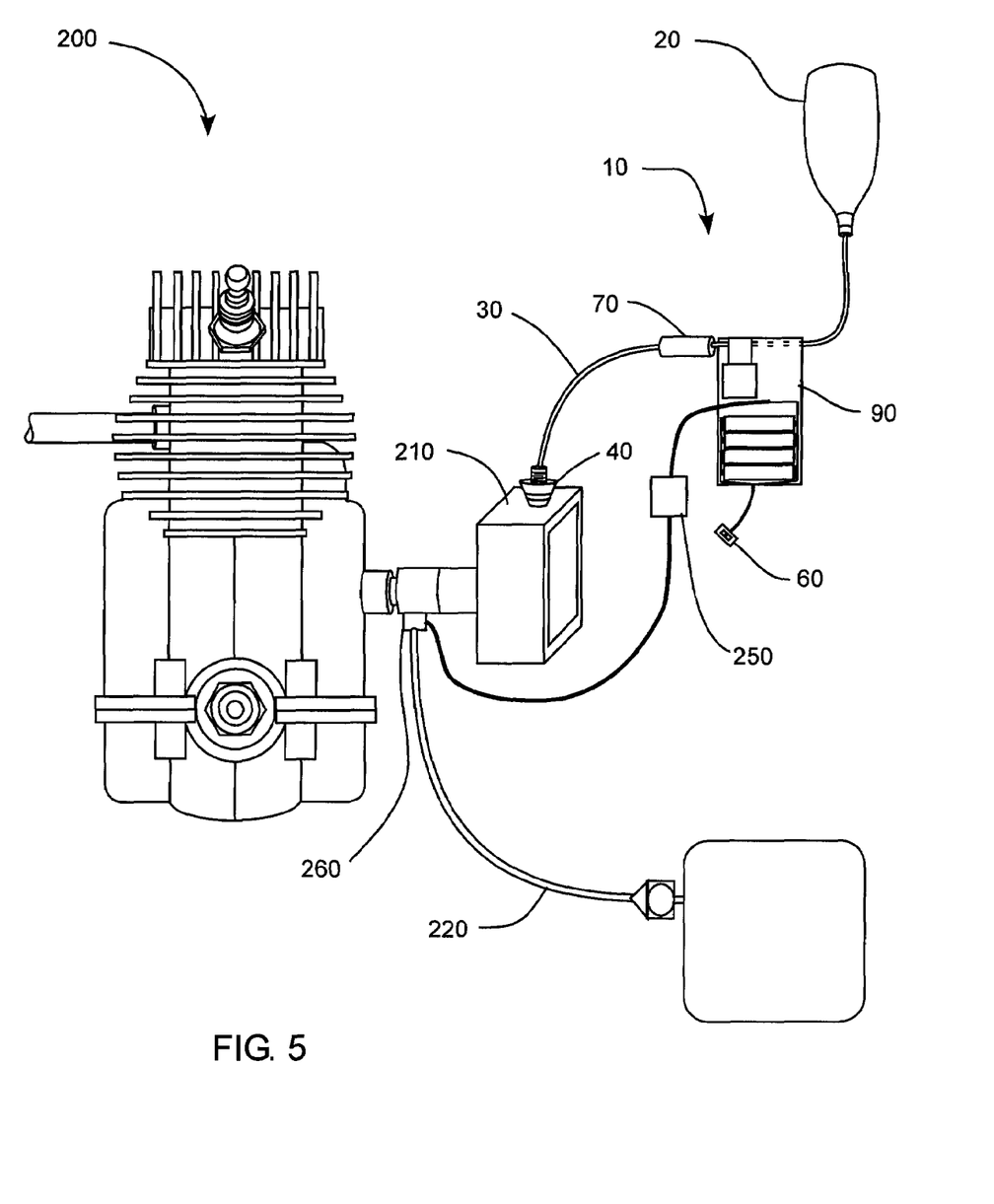
FIG. 5 is a schematic view of a nitrous-oxide system in accordance with an embodiment of the present invention.

As shown in FIG. 5, a fuel controller 250 can be coupled to the control switch 60 and an electronic fuel injector system 260, to change the fuel injector system 260 to provide more fuel when the control switch 60 is activated. The fuel controller 250 can be external to the enclosure, or can be included inside the enclosure with the battery power source and the nitrous-oxide valve.

A method for retrofitting an engine of a gasoline powered vehicle with a nitrous-oxide system includes coupling a nitrous-oxide bottle to the vehicle. A nozzle can be coupled to an air box of the vehicle engine, or the like. A nitrous-oxide line can be coupled between the nitrous-oxide bottle and the nozzle. The nitrous-oxide line can have a nitrous-oxide valve capable of controlling flow of nitrous-oxide through the nitrous-oxide line. An enclosure can be secured to the vehicle. The enclosure can include the nitrous-oxide valve. A control switch can be positioned on the vehicle. The control switch can be operatively coupled to the valve or the battery power source. Thus, the system is relatively easy to install because it is not necessary to tap into the vehicle or engine power source.

The method can further include coupling a secondary fuel line between a fuel tank and a carburetor. The secondary fuel line can include a fuel valve capable of controlling the flow of fuel through the secondary fuel line.

The method can further include coupling a fuel controller between the control switch and an electronic fuel injector system. The fuel controller can change the fuel injector system to provide more fuel when the control switch is activated.

The method can further include enclosing a battery power source within the enclosure. Thus, the battery power source and valves can be housed together within the enclosure which can easily be mounted on structure within the vehicle engine compartment.

The method can further include turning fuel adjustment knobs coupled to the secondary fuel lines proximate the carburetors. The nitrous-oxide valve and fuel valves can also be adjusted to balance the fuel-nitrous-air mixture and tune the engine to optimal performance.

The method can further include regulating the pressure of the nitrous-oxide to lower than 300 psi with a pressure regulator coupled to the nitrous-oxide line. The regulator can regulate pressure to 500 psi, 300 psi or even as low as 280 psi.

The present invention also provides a method for injecting nitrous-oxide into an internal combustion engine which includes providing a nitrous-oxide system that can be coupled to an engine. The nitrous-oxide system can include a nitrous-oxide valve that can be coupled to a nitrous-oxide line to control flow of nitrous-oxide from a nitrous-oxide bottle to a nozzle. The nitrous-oxide system can also include a battery power source that can be electrically coupled to the nitrous-oxide valve. The battery power source can be independent of the electrical system of the engine or battery of the engine. Instructions can be given with respect to how to couple the nitrous-oxide system to the engine and the battery power source to the nitrous-oxide system.

Figure 6:
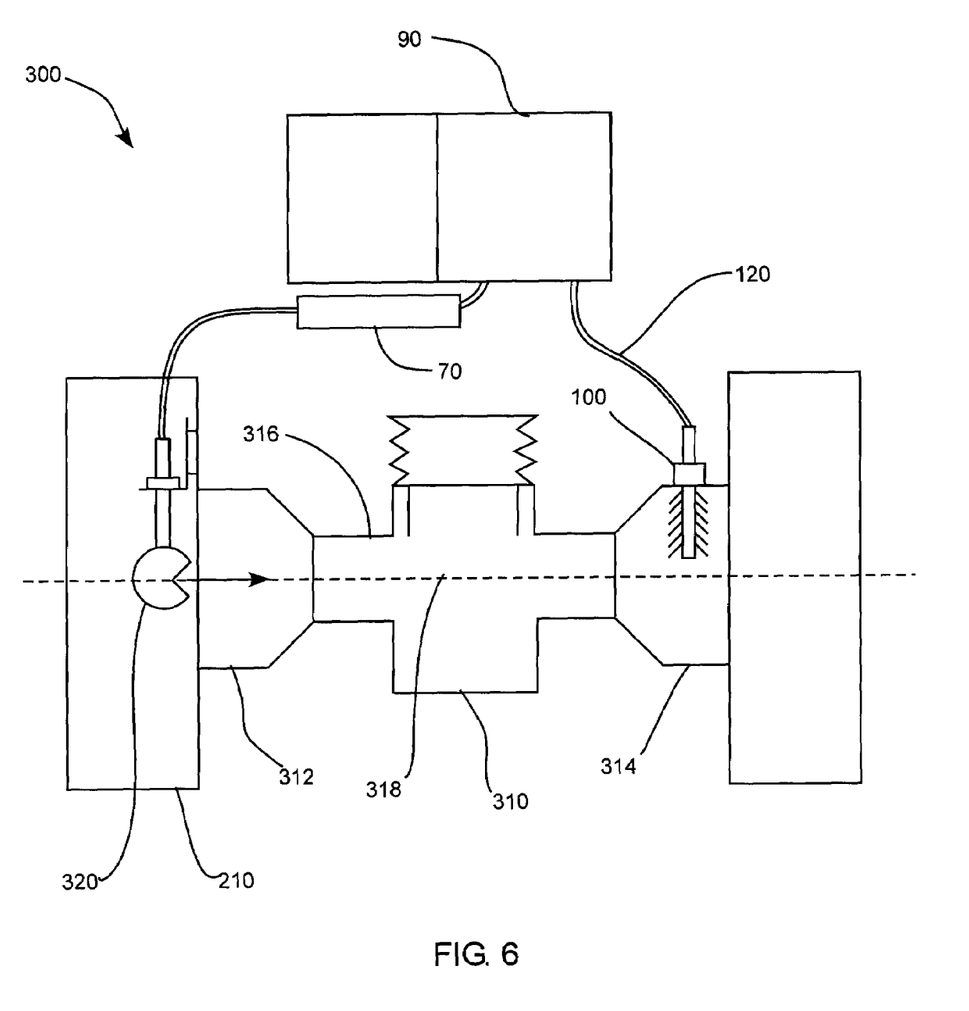
FIG. 6 is a schematic view of a nitrous-oxide system in accordance with an embodiment of the present invention.

Referring to FIG. 6, a nitrous-oxide system 300 coupled to a carburetor 310 is shown that is similar in many respects to the nitrous-oxide systems described above. The carburetor 310 can be coupled to a gasoline powered internal combustion engine.

The carburetor 310 can have a carburetor inlet 312, a carburetor outlet 314, and a throat 316 between the inlet 312 and the outlet 314.

The nitrous-oxide system can include a nitrous-oxide nozzle 320. The nozzle 320 can be positioned adjacent the carburetor inlet 312, and oriented to direct nitrous-oxide into the throat 316 of the carburetor 310. In one aspect, the nozzle 320 can be positioned in the air box 210 of an engine directly next to the inlet 312 of the carburetor 310. The nozzle 320 can also be oriented to open toward the throat 316 of the carburetor 310 and can be positioned along a longitudinal axis, shown by dashed lines at 318, of the throat 316 so that when nitrous-oxide is expelled from the nozzle 320, the nitrous-oxide is directed into the throat 316 of the carburetor 310. In this way, the nozzle 320 can force or shoot nitrous-oxide into the throat 316 of the carburetor 310. Fuel adjustment valves 100 can be positioned in the outlet 314 of the carburetor 310.

Directing or forcing nitrous-oxide directly into the throat 316 of the carburetor 310 provides several advantages. For example, with the nozzle 320 positioned at the throat 316 of the carburetor 310, more nitrous-oxide can be injected into the carburetor and thus more power can be produced by the engine. It will be appreciated that a carburetor has a fixed volume that can only displace or draw a specific amount of air-fuel mixture, and, thus, forcing or shooting nitrous-oxide directly into the throat of the carburetor can result in a larger percentage or concentration of nitrous-oxide in the carburetor. Moreover, having more nitrous-oxide provides more oxygen for the fuel to combust and consequently more fuel can also be added, and, as previously noted, more fuel and more oxygen result in more power produced by the engine. Surprisingly, it has been found that by positioning and orienting the nozzle 320 in this way can result in significant and dramatic horsepower increases of the engine. In one aspect, the increase in horsepower caused by a nitrous-oxide system thus described has been approximately doubled.

Additionally, it has been found that placing the nitrous-oxide nozzle 320 in such close proximity to the carburetor 310 can produce a nearly instantaneous increase in horsepower when the nitrous-oxide system is engaged. It will be appreciated that, placing the nitrous-oxide nozzle in the air box 210 of an engine introduces nitrous-oxide that can mix with air in the air box which is then drawn into the carburetor and mixed with fuel in preparation for combustion. However, mixing the nitrous-oxide with air in the air box takes time and can cause a slight delay between engaging the nitrous-oxide system and realizing an increase in horsepower in the engine. Furthermore, as noted above, allowing the nitrous-oxide to mix with air in the air chamber creates a lower percentage nitrous-oxide and air mixture that is drawn into the carburetor. Thus, positioning the nozzle in such a way as to be able to directly inject, force or shoot nitrous-oxide into the throat 316 of the carburetor 310 produces a nearly instantaneous and more powerful increase in horsepower from the engine.

Figure 7:
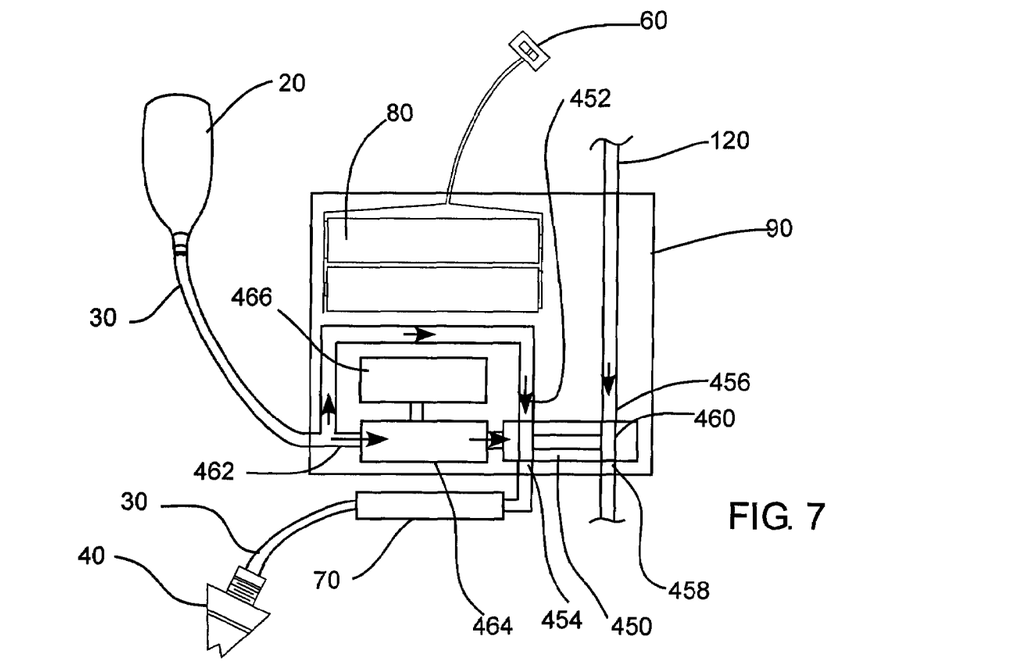
FIGS. 7 and 8 are schematic views of a nitrous-oxide system in accordance with an embodiment of the present invention.
Figure 8:
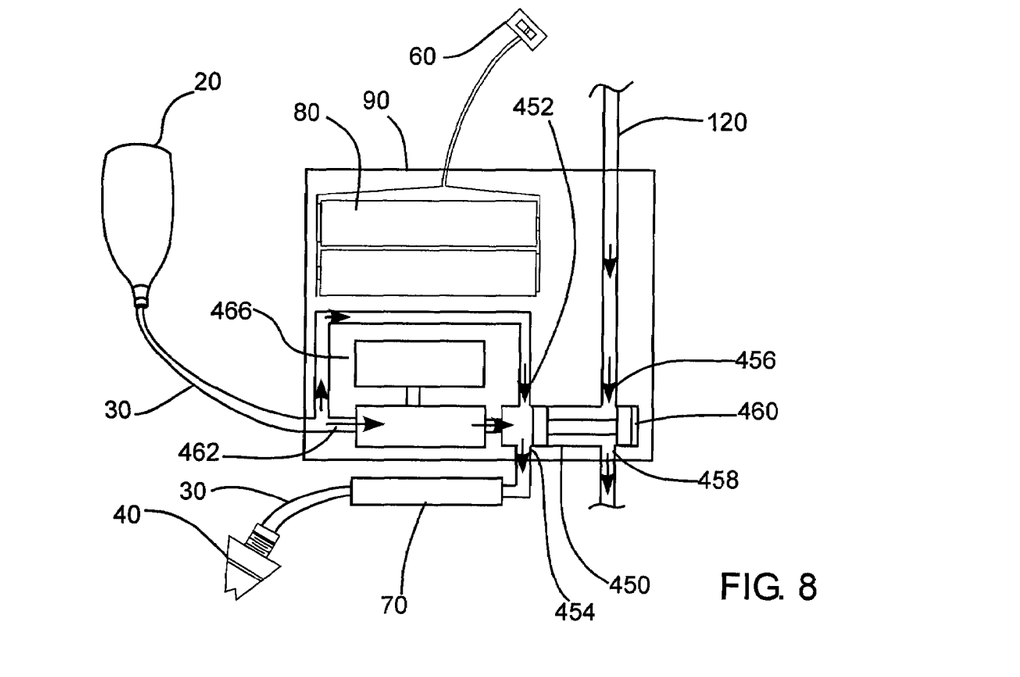

Referring to FIGS. 7-8, a nitrous-oxide system 400 is shown that is similar in many respects to the nitrous-oxide systems described above in accordance with another embodiment of the present invention. Additionally, the nitrous-oxide system 400 can have a nitrous-oxide bottle 20 that can contain nitrous-oxide. A nitrous-oxide nozzle 40 can be coupled to the nitrous-oxide bottle 20 and can be disposable in an engine air box (not shown). The nitrous-oxide nozzle 40 can direct flow of nitrous-oxide from the nitrous-oxide bottle 20 by a nitrous-oxide line 30.

The nitrous-oxide system 400 can also have a dual valve 450 that can be coupled to, and control the flow in both the nitrous-oxide line 30 and an auxiliary fuel line 120 of the engine. The dual valve 450 can control the flow of nitrous-oxide between the nitrous-oxide bottle 20 and nitrous-oxide nozzle 40 and also control the flow of fuel between a secondary fuel line 120 in the engine and a carburetor 230.

Specifically, the dual valve 450 can have a nitrous-oxide inlet 452 coupled to the nitrous-oxide bottle 20 and a nitrous-oxide outlet 454 coupled to the nozzle 40. The dual valve 450 can also have a fuel inlet 456 coupled to a fuel line 120 of the engine and a fuel outlet 458 coupled to a carburetor 230. A stopper 460 can be movable in the valve 450 between the nitrous-oxide inlet 452 and the nitrous-oxide outlet 454, and between the fuel inlet 456 and the fuel outlet 458. The stopper 460 can simultaneously open the nitrous-oxide and fuel lines, as shown in FIG. 8, and close the nitrous-oxide and fuel lines, as shown in FIG. 7. A control line 462 between the nitrous-oxide line 30 and the stopper 460 can utilize the pressure of the nitrous-oxide to move the stopper 460. The dual valve can be, or can include, a spool valve or the like.

A control valve 464 can be coupled to the control line 462, and a solenoid 466 can be coupled to the control valve 464. The control valve 464 can control actuation of the solenoid 466 so that when the nitrous-oxide system 400 is engaged, the control valve 464 actuates the solenoid 466 which in turn allows the pressure of the nitrous-oxide to move the stopper 460 thereby opening the both the nitrous-oxide and auxiliary fuel lines.

Advantageously, using the dual valve 450 of the present invention eliminates the need for a separate solenoid in the auxiliary fuel line 120 to control the flow of additional fuel to the carburetor 230. It will be appreciated that eliminating a solenoid reduces the power requirements for engaging and running the nitrous-oxide system of the present invention. Consequently, battery life can be extended and the risk of run down batteries during operation of the engine can be reduced. In addition, the control valve 464 can be configured to provide pressure, rather than flow, so that it can be smaller and thus require a smaller solenoid 466 that draws less power from the battery source.

The present invention also provides for a method for retrofitting an engine of a gasoline powered vehicle with a nitrous-oxide system including positioning a nozzle at an inlet of a carburetor. The nozzle can be coupled to a nitrous-oxide bottle. The nozzle can be oriented to direct the flow of nitrous-oxide into the throat of the carburetor. Additionally, an auxiliary fuel nozzle can be positioned at an outlet of the carburetor.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. A nitrous-oxide system for an engine, comprising:
    a) an internal combustion engine having a fuel line;
    b) a nitrous-oxide bottle, containing nitrous-oxide;
    c) a nitrous-oxide line, coupled to the nitrous-oxide bottle;
    d) a nozzle, coupled to the nitrous-oxide line, and operatively coupled to an engine intake;
    e) a nitrous-oxide valve, coupled to the nitrous-oxide line between the nitrous-oxide bottle and the nozzle;
    f) a control switch, operatively coupled to the nitrous-oxide valve;
    g) an inline pressure regulator, coupled to the nitrous-oxide line between the nitrous-oxide bottle and the nozzle, with an inlet and an outlet coupled to the nitrous-oxide line, and capable of regulating pressure of the nitrous-oxide delivered to the nozzle to lower than 500 psi; and
    h) a fuel controller, coupled to the control switch and configured to be coupled to an electronic fuel injector system, to change the fuel injector system to provide more fuel when the control switch is activated.

2. A nitrous-oxide system in accordance with claim 1, wherein the pressure regulator maintains a pressure of the nitrous-oxide at lower than 500 psi until the nitrous-oxide bottle is 10% full.

3. A nitrous-oxide system in accordance with claim 1, wherein the pressure regulator is positioned between the nitrous-oxide valve and the nozzle.

4. A nitrous-oxide system in accordance with claim 1, wherein the pressure regulator is positioned between the nitrous-oxide bottle and the nitrous-oxide valve.

5. A nitrous-oxide system in accordance with claim 1, further comprising:
    the nozzle being positioned at a carburetor inlet and oriented along a longitudinal axis of a carburetor throat.

6. A nitrous-oxide system in accordance with claim 1, wherein the pressure regulator regulates the pressure of the nitrous-oxide so that the pressure of the nitrous-oxide injected into the engine fuel is constant over a range of operating temperatures.

7. A nitrous-oxide system in accordance with claim 1, further comprising a power source independent of a power source of the engine.

8. A nitrous-oxide system and a carburetor for a gasoline powered internal combustion engine, comprising:
    a) a carburetor inlet, a carburetor outlet, and a throat therebetween; and
    b) a nitrous-oxide nozzle, positioned adjacent the carburetor inlet to force nitrous-oxide into the throat;
    c) a nitrous-oxide valve, coupled to a nitrous-oxide line between a nitrous-oxide bottle and the nitrous-oxide nozzle;
    d) a control switch, operatively coupled to the nitrous-oxide valve; and
    e) a pressure regulator, disposed in the nitrous-oxide line between the nitrous-oxide valve and the nozzle, and capable of regulating pressure of the nitrous-oxide delivered to the nozzle to lower than 500 psi.

9. A nitrous-oxide system in accordance with claim 8, wherein the nitrous-oxide nozzle is oriented along a longitudinal axis of the throat to direct flow of nitrous-oxide directly into the throat.

10. A nitrous-oxide system in accordance with claim 8, further comprising a fuel controller, coupled to the control switch and configured to be coupled to an electronic fuel injector system, to change the fuel injector system to provide more fuel when the control switch is activated.

11. A nitrous-oxide system in accordance with claim 8, further comprising:
    a) a secondary fuel line, configured to tap into a primary fuel line of the engine, and extendable to the outlet of the carburetor, to provide a secondary source of fuel with respect to the primary fuel line;
    b) a fuel valve, coupled to the secondary fuel line, to control flow of fuel through the secondary fuel line to the carburetors; and
    c) the control switch operatively coupled to the fuel valve.

12. A nitrous-oxide system in accordance with claim 8, wherein the pressure regulator regulates the pressure of the nitrous-oxide so that the pressure of the nitrous-oxide injected into the engine fuel is constant over a range of operating temperatures.

13. A nitrous-oxide system in accordance with claim 8, further comprising a power source independent of a power source of the engine.

14. A nitrous-oxide system in accordance with claim 8, further comprising an enclosure configured to contain the nitrous-oxide system.

15. A method for retrofitting an engine of a gasoline powered vehicle with a nitrous-oxide system, comprising the step of:
  a) positioning a nozzle at an inlet of a throat of a carburetor, the nozzle being coupled to a nitrous-oxide bottle containing nitrous-oxide;
  b) orienting the nozzle to direct flow into the throat of the carburetor; and
  c) regulating the pressure of the nitrous-oxide to lower than 500 psi with a pressure regulator coupled to the nitrous-oxide line.

16. A method in accordance with claim 15, wherein the nitrous-oxide line further includes a nitrous-oxide valve capable of controlling flow of nitrous-oxide through the nitrous-oxide line.

17. A method in accordance with claim 15, further comprising the step of:
  coupling a fuel controller between a control switch operatively coupled to the nitrous-oxide valve and an electronic fuel injector system, to change the electronic fuel injector system to provide more fuel when the control switch is activated.

18. A nitrous-oxide system for an engine, comprising:
  a) an internal combustion engine having a fuel line;
  b) a nitrous-oxide bottle, containing nitrous-oxide;
  c) a nitrous-oxide line, coupled to the nitrous-oxide bottle;
  d) a nozzle, coupled to the nitrous-oxide line, and operatively coupled to an engine intake;
  e) a nitrous-oxide valve, coupled to the nitrous-oxide line between the nitrous-oxide bottle and the nozzle;
  f) a control switch, operatively coupled to the nitrous-oxide valve;
  g) an inline pressure regulator, coupled to the nitrous-oxide line between the nitrous-oxide bottle and the nozzle, with an inlet and an outlet coupled to the nitrous-oxide line, and capable of regulating pressure of the nitrous-oxide delivered to the nozzle to lower than 500 psi;
  h) a secondary fuel line, couplable to a primary fuel line extending between a tank and a carburetor, the secondary fuel line extendable to the carburetor, to provide a secondary source of fuel with respect to the primary fuel line; and
  i) wherein the nitrous-oxide valve is a dual valve capable of controlling the flow of nitrous-oxide between the nitrous-oxide bottle and the nozzle and also the flow of fuel between the secondary fuel line and the carburetor.

19. A nitrous-oxide system for an engine, comprising:
  a) an internal combustion engine having a fuel line;
  b) a nitrous-oxide bottle, containing nitrous-oxide;
  c) a nitrous-oxide line, coupled to the nitrous-oxide bottle;
  d) a nozzle, coupled to the nitrous-oxide line, and operatively coupled to an engine intake;
  e) a nitrous-oxide valve, coupled to the nitrous-oxide line between the nitrous-oxide bottle and the nozzle;
  f) a control switch, operatively coupled to the nitrous-oxide valve;
  g) an inline pressure regulator, coupled to the nitrous-oxide line between the nitrous-oxide bottle and the nozzle, with an inlet and an outlet coupled to the nitrous-oxide line, and capable of regulating pressure of the nitrous-oxide delivered to the nozzle to lower than 500 psi;
  h) a secondary fuel line, couplable to a primary fuel line extending between a tank and a carburetor, the secondary fuel line extendable to the carburetor, to provide a secondary source of fuel with respect to the primary fuel line;
  i) a fuel valve, coupled to the secondary fuel line, to control flow of fuel through the secondary fuel line to the carburetors; and
  j) the control switch operatively coupled to the fuel valve.

* * * * *